(No Model.)
C. B. DUDLEY.
PURIFYING FEED WATER.
No. 285,591. Patented Sept. 25, 1883.
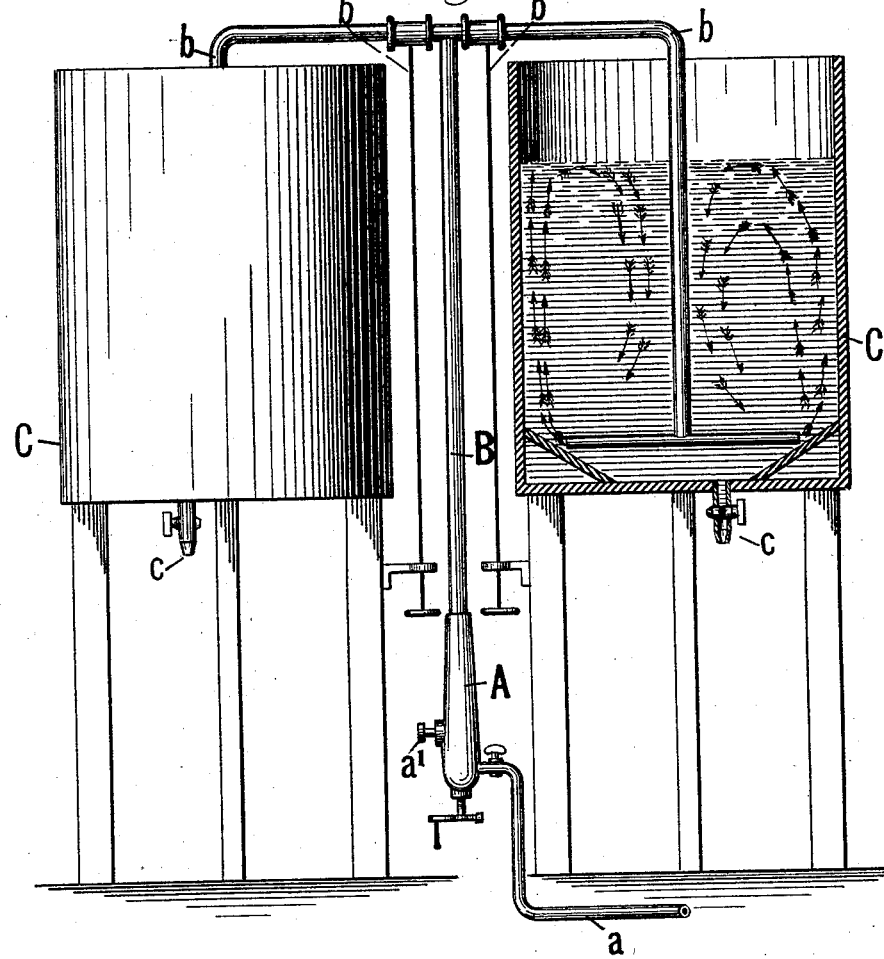
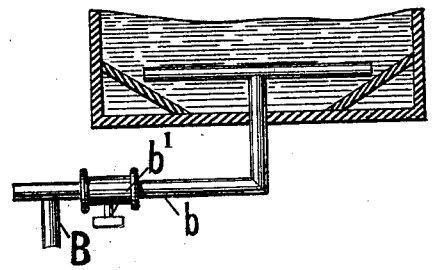
WITNESSES:
T. S. West
Wm. T. Emerson.
INVENTOR:
C. B. DUDLEY,
BY H. W. Beadle & Co.
ATTYS

UNITED STATES PATENT OFFICE.

CHARLES B. DUDLEY, OF ALTOONA, PENNSYLVANIA.

PURIFYING FEED-WATER.

SPECIFICATION forming part of Letters Patent No. 285,591, dated September 25, 1883.

Application filed February 14, 1883. (No model.)

*To all whom it may concern:*

Be it known that I, CHARLES B. DUDLEY, of Altoona, county of Blair, and State of Pennsylvania, have invented new and useful Improvements in Methods of Purifying Feed-Water; and I do hereby declare that the following is a full and exact description of the same, reference being had to the accompanying drawings, and to the letters of reference marked thereon.

This invention consists, first, in a special method of treating natural waters which are undergoing a process of purification, and, second, in the special apparatus employed in connection therewith.

A general statement of the method, which is believed to be new, may be made as follows: Into a water volume containing the proper chemical substances for purifying the same is introduced a mingled current of air and steam under pressure. By means of this current of air and steam under pressure the entire volume of water is instantly thrown into violent agitation, and the purifying materials are thereby rapidly and thoroughly disseminated through the entire mass of water. In consequence of this dissemination and the complete diffusion of the chemical substances through the entire mass the proper chemical reactions are quickly and perfectly performed; also, in consequence of this agitation the precipitated mineral matters are coagulated in such a manner that the subsequent settling is very greatly facilitated.

The novelty of the special apparatus employed consists, in the art of purifying waters, of the combination of an injector and system of distributing-pipes with two or more tanks, and means, substantially described, for directing the injected current alternately to each tank, as will be fully described hereinafter.

In the drawings, Figure 1 represents a front view of my improved apparatus, consisting of an air-injector, a system of distributing-pipes with proper cocks, and two water-tanks; and Fig. 2, a partial view, illustrating a modified construction of distributing-pipes.

To enable others skilled in the art to understand my method and to carry it practically into effect, I will proceed to describe the same fully in connection with the apparatus employed in connection therewith.

In the practice of the art of purifying natural waters for boiler use upon a large scale for commercial purposes it has been found difficult to effect the chemical reactions perfectly and speedily on account of the large mass to be treated. It has also been found difficult to effect a rapid settling of the precipitated mineral matters. Both of these difficulties have been largely overcome by introducing into the mass, while the chemicals are being introduced, or afterward, a mingled current of air and steam under high pressure.

The apparatus employed in the practice of this method is constructed as follows:

A represents an injector having the usual pipe, $a$, connected with any proper source of steam-supply, and $a'$ an opening through which the air is admitted into the injector in the manner well understood.

B represents a main or distributing-pipe, and $b\ b$ branches leading to the bottom of the tanks, either from above, as shown in Fig. 1, or from below, as shown in Fig. 2.

$b'\ b'$ represent cocks, or the stems of cocks, in the branch pipes, by means of which the current of mingled air and steam from the injector may be delivered alternately into each tank.

C C represent the tanks, of any proper construction, which are adapted, in the usual manner, to receive a water-supply from any proper source, and to deliver the same as needed to the engines.

$c\ c$ represent cocks by means of which the waste substances accumulating in the tanks may be removed when desired.

The operation is substantially as follows: The tanks having been supplied with water, the current of mingled air and steam from the injector is introduced and caused to violently agitate the entire mass, either before, during, or after the introduction of the chemicals, as preferred. When this action has been properly performed, the contents are allowed to rest for a proper time, and then the purified water is drawn off for use. These tanks are alternately subjected to the action of the injector, the contents of one tank being treated while the contents of the other are being drawn off for use. By this means a continuous supply of purified water is obtained for use. By the alternate use of the tanks a single injector may be employed for both.

If desired, more than two tanks may be employed at once; but in this case, also, the injector would be employed successively for each set in order to furnish a constant supply of purified water. The introduction of steam alone into the water to be purified would not successfully accomplish the end desired. The steam alone would condense as soon as it touches the water, and agitation and admixture would not result until the water became heated by the steam sufficiently to cause currents. This would require in water purification an enormous amount of steam. Air being introduced along with the steam, the end desired—viz., agitation of the water and admixture of the chemicals therewith—is accomplished rapidly, easily, and at small expense. In reality, the steam is simply the vehicle by means of which the air is carried into the water to be purified.

Having thus fully described my invention, what I claim as new, and desire to secure by Letters Patent, is—

1. The method of purifying natural waters for boiler use, consisting in the introduction into a water volume containing the proper chemical substances of a mixed current of air and steam under pressure, substantially as described.

2. As a means for purifying natural waters, the combination of an air and steam injector and a system of distributing-pipes with two or more tanks, and means, substantially as described, for directing the injected current alternately to each tank.

This specification signed and witnessed this 10th day of February, 1883.

CHAS. B. DUDLEY.

Witnesses:
H. W. BEADLE,
JAS. P. RYON.